United States Patent [19]

Senes et al.

[11] 4,228,039
[45] Oct. 14, 1980

[54] CATALYTIC COMPOSITION USED IN PURIFYING GASEOUS EFFLUENTS POLLUTED BY NITROGEN OXIDES AND PROCESS FOR PREPARING THE COMPOSITION

[75] Inventors: Michel Senés, La Baule; Yannick Le Goff; Jean F. Gourdier, both of Saint Nazaire; Jacques Quibel, Maisons Laffitte, all of France

[73] Assignee: Societe Chimique de la Grand e Paroisse, Paris, France

[21] Appl. No.: 973,626

[22] Filed: Dec. 27, 1978

[30] Foreign Application Priority Data

Dec. 28, 1977 [FR] France ............................... 77 39422

[51] Int. Cl.³ .................... B01J 21/04; B01J 23/10; B01J 23/84; B01J 23/86
[52] U.S. Cl. .................................. 252/462; 252/464; 252/465; 423/239
[58] Field of Search ...................... 252/462, 464, 465; 423/213.5, 239

[56] References Cited

U.S. PATENT DOCUMENTS

| | | | |
|---|---|---|---|
| 3,857,921 | 12/1974 | Tamura et al. | 252/466 J |
| 4,029,738 | 6/1977 | Courty et al. | 423/213.2 |
| 4,071,472 | 1/1978 | Senes et al. | 252/455 R |

*Primary Examiner*—W. J. Shine
*Attorney, Agent, or Firm*—Browdy and Neimark

[57] ABSTRACT

Gaseous effluents polluted by nitrogen oxides are purified by catalytic reduction. The catalytic compositions used contain iron and chromium associated with alumina and optionally at least a promoter selected from rare earth oxides with a content between 0.1 and 1% in relation to the active material and crude platinum metals with a content between 1 and 5 ppm in relation to the active material, the specific surface of the compositions being between 50 and 300 $m^2/g$ and the dimensions of the pores between 40 and 50,000 Å. These compositions are applicable for processes of purification of nitrogen oxides with any content.

15 Claims, No Drawings

CATALYTIC COMPOSITION USED IN PURIFYING GASEOUS EFFLUENTS POLLUTED BY NITROGEN OXIDES AND PROCESS FOR PREPARING THE COMPOSITION

FIELD OF THE INVENTION

The present invention relates to catalyst compositions used in purification of gaseous effluents polluted by nitrogen oxides and to processes for making such compositions.

BACKGROUND OF THE INVENTION

To combat industrial pollution, it is necessary to have means to eliminate toxic wastes, including the nitrogen oxides produced in all types of combustion.

One of the standard methods in this type of purification consists in reduction of the nitrogen oxides. The reaction is performed on catalysts whose actives sites are crude platinum metals and also the metal oxides currently used for catalytic oxidation.

The reducing gas can be taken from any available sources. In the case of plants manufacturing nitric oxide by catalytic oxidation reaction of ammonia, the raw material being ammonia, ammonia is thereby the perfect source of reducing gas.

It is well known in heterogeneous catalysis that it is not sufficient to use the active elements initiating the various categories of chemical reactions; i.e., oxidation, hydrogenation, cracking, etc, but it is necessary to be able to use the most economic reaction possible.

Also, industry looks for a catalyst exhibiting the greatest possible activity, which is reflected by a slight volume of catalyst, a small size reactor and very improved conditions of the process of reduction of the nitrogen oxides, namely; low temperature, high delivery of gaseous effluents in the reactor, high rate of transformation, improved selectivity. Also a catalyst is looked for whose life is compatible with the economy of the process.

These conditions are favored, depending on the way the active sites of the solid catalyst participate in the reaction. In particular, the structure of the solid, its texture, and the promoters are, for a composition of given active elements, factors of essential importance.

Catalysts whose active sites are crude platinum metals, prepared by processes of impregnation or exchange of the platinum, have a heterogeneous structure made up of a support on which the platinum is deposited, which results in an irregular distribution of the active sites and consequently in a limited efficiency. Further, these catalysts are obtained from rare and expensive metals.

Compositions have been proposed in U.S. Pat. No. 4,071,472 that make it possible to eliminate nitrogen oxides with purification yields on the order of 99%, in reduction processes performed at high volumetric rates. These compositions contain as active elements iron, chromium and vanadium in oxide form, taken separately or in combination, in an amount between 96 and 99.5% by weight; the specific surface being between 20 and 100 m$^2$/g, and further the dimensions of the pores are between 100 and 5,000 Å. Further, rare earth elements in an amount between 0.5 and 4% are introduced in these compositions, and at times advantageously a crude platinum metal in an amount between 0.001 and 0.0001%.

These compositions are obtained by careful decomposition of the nitrate solutions of the active elements by a controlled progression of the temperature from 200° C. to 600° C., by stages of 50° C., maintaining each temperature stage about an hour.

SUMMARY OF THE INVENTION

Catalytic compositions containing iron and chromium as active elements and optionally promoters such as rare earth oxides and crude platinum metals have been found. These new compositions are obtained and introduced in amounts less than in the prior art compositions by ways of preparation that are simpler to use and less costly. They have proven to be very interesting by making possible a diversification of fabrication methods, they result in obtaining similar purification yields, with equivalent performances in identical fields of application.

According to the present invention, the catalytic compositions contain as active elements iron and chromium in oxide form associated with alumina and optionally at least one promoter selected from rare earth oxides alone or in combination with crude platinum metals. The content of the rare earth oxides taken separately or in combination, such as cerium, lanthanum and neodymium, is between 0.1 and 1% by weight in relation to the active material, the content of the crude platinum metal being between 1 and 5 ppm by weight in relation to the active material. The crude platinum metal include platinum, iridium, osmium, palladium, rhodium and ruthenium. The specific surface of the compositions is between 50 and 300 m$^2$/g and the dimensions of the pores between 40 and 50,000 Å.

These compositions can advantageously contain vanadium in oxide form at a rate of at most 4% of the total weight of the catalyst.

According to an object of the present invention, in certain compositions the content of active elements in relation to the total weight of the catalyst is between 12 and 25%, the remainder being made up of promoters and alumina.

According to another object of the present invention, in certain catalytic compositions the alumina content is between 5 and 20% of the total weight of the catalyst, the remainder of 80 to 95% being made up of the active elements iron and chromium in the oxide form alone or associated with promoters; iron being advantageously preponderant and present in oxide form with a content between 70 and 85%.

Obtaining of the catalytic compositions of the present invention as a function of the alumina content resorts to two different techniques: impregnation and coprecipitation.

According to the impregnation technique, there is performed impregnation, in two stages, of an alumina base support, previously treated between 200° and 500° C. for several hours. In a first stage, the support is impregnated with a solution of chromium ions such as chromic acid containing promoters in concentrations adjusted as a function of the contents selected and in a second stage impregnation is performed with a solution of soluble salts of the other active elements in a concentration adjusted as a function of the contents selected. Each impregnation is followed by a drying for 3 to 6 hours at a temperature on the order of 120° C., then a heat treatment in the air between 350° and 450° C. for 5 to 15 hours.

Advantageously, the pretreatment of the support and the second stage of impregnation can be performed under vacuum. This particular preparation condition is reflected by an increase in the amount of active material deposited.

After treatment of the support between 200° and 500° C. under air or vacuum, it is cooled in a dry atmosphere to 60°–80° C., and impregnation, in its first stage, is advantageously performed in this temperature zone of 60° to 80° C., while the second stage of impregnation takes place at ambient temperature.

The support generally used is alumina, in various shapes (balls, rings) with high specific surface from 100 to 300 m$^2$/g.

The active elements are deposited from their soluble salts, most often nitrates. It is the same for the promoters of the rare earth groups alone or in combination such as cerium, lanthanum, neodymium in nitrate form and from soluble compounds of crude platinum metals, such as chloroplatinic acid. The first impregnation solution has chromium ions as an essential constituent, preferably, chromic acid with promoters as an additive, and the second impregnation solution has ferric nitrate as an essential constituent; it can also contain a soluble vanadium salt such as ammonium oxalate vanadate.

The active elements are in the oxide state $Fe_2O_3$, $Cr_2O_3$ and optionally, $V_2O_5$, simple or combined, deposited on the support. The total content of active elements, expressed in oxides, is between 12 and 15% by weight of the catalyst, the remainder being made up of promoters, alumina and, optionally, vanadium oxide. The specific surface of the catalyst is between 100 and 300 m$^2$/g, the diameter of the pores being between 40 and 50,000 Å.

According to the coprecipitation technique, there is precipitated by a basic reagent a mixture of soluble salts of active elements, promoters and aluminum. The formed precipitate is isolated, and after filtration and washing it is subjected to a drying for about 24 hours at a temperature between 100° and 120° C. It is then packaged in a suitable form, such as pellets, and heat decomposition is performed under air with progressive elevation of the temperature by 50° C. per hour to a temperature between 350° and 500° C., keeping the temperature stage for 5 to 10 hours.

Iron, chromium and alumina are most often introduced in the form of nitrates as well as rare earths alone or in combination such as cerium, lanthanum, and neodymium; the vanadium may optionally be introduced in the form of ammonium oxalate vanadate.

The basic reagent, selected from ammonia, soda or a carbonate, is used in excess in relation to the stoichiometry of the corresponding hydroxides.

The alumina content is between 5 and 20% of the total weight of the catalyst, the remainder being made up of active elements and promoters, at a rate of 80 to 95% of the total weight of the catalyst. It can be advantageous to introduce iron in preponderant proportions, with contents between 70 and 85% of the total weight of the catalyst.

The compositions are particularly effective in which the alumina content is between 7 and 13% of the total weight of the catalysts and the content of active elements of iron and chromium in oxide form between 87 and 93%, the latter being optionally associated with vanadium in oxide form and optionally in the presence of at least one promoter selected from the rare earch oxides such as cerium, lanthanum, and neodymium. The promoter content is between 0.1 and 1%; and the vanadium in oxide form is introduced at most at a rate of 4% of the weight of the catalyst.

The coprecipitation method makes it possible to obtain a finely divided catalyst with a homogeneous distribution of all the active elements and promoters in the totality of the composition. Introduction of alumina in the catalyst makes it possible to increase particularly the specific surface of the catalyst, which is between 50 and 150 m$^2$/g, the diameter of the pores being 50 to 5,000 Å.

The catalytic compositions of the present invention are applicable with great success in a process of purification, in the presence of a reducing gas, of gases containing nitrogen oxides at a temperature between 120° and 350° C., under a pressure of at least one bar, effective, with a volumetric velocity of circulation of gases, VVH, that can be high and amount to 80,000.

The reducing gas used in not specific, hydrogen and ammonia being particularly suitable.

It has been found that pressure has an influence on the activity of the purification catalysts. The process of reduction of nitrogen oxides can be performed advantageously under pressures between 5 and 50 bars absolute.

The process is suitable for purification of gaseous effluents with all contents of nitrogen oxides. The effectiveness is remarkable even at high contents on the order of 20,000 vpm, and also at slight contents on the order of 10 to 200 vpm.

The purification process used on the catalytic compositions of the invention is particularly well suited for depollution of tail gases thrown out into the atmosphere in the making of nitric acid.

DETAILED DESCRIPTION OF THE PREFERRED EMBODIMENT

The following examples of preparing catalytic compositions and of use, given by way of non-limiting examples, will show the advantages of the invention.

EXAMPLE 1

Impregnation Method

There are dried at 400° C. for 5 hours, 1.6 l of alumina balls with large specific surface, with an average pore diameter of 60 Å. After drying, the weight is 934 g. The alumina support is cooled at 70° C., and impregnated at this temperature for an hour with a solution of chromic acid of a volume of 570 ml containing 114 g of $CrO_3$ and 0.69 mg of $H_2PtCl_6$, and dried at 120° C. for 4 hours and roasted at 400° C. for 12 hours.

After cooling at ambient temperature, the balls are impregnated with a solution of ferric nitrate with a volume of 760 ml containing 380 g of $Fe(NO_3)_3.9H_2O$. After separation of the remaining solution, they are subjected to a drying at 120° C. for 12 hours, then roasted at 400° C. for 12 hours.

The weight of the catalyst obtained is 1065 g; the content of catalyst I in iron and chromium oxides deposited is 12.3% of which 8.1% is $Cr_2O_3$ and 4.2% is $Fe_2O_3$; the platinum content is 2.5 ppm in relation to the total weight of iron and chromium oxides.

EXAMPLE 2

Coprecipitation Method

There are put in solution in 40 liters of water: 1471 g of aluminum nitrate, $Al(NO_3)_3.9H_2O$, 7741 g of ferric nitrate, $Fe(NO_3)_3.9H_2O$; 1421 of chromium nitrate, $Cr(NO_3)_3.9H_2O$; and 22.7 g of cerium nitrate, $Ce(NO_3)_3.6H_2O$. There are added, with agitation, 7.6 l of a solution containing 13.5 moles/l of ammonia. The precipitate is filtered and washed on a filter press to neutrality of the wash waters. Then it is dried at 120° C. for 24 hours.

After granulation and addition of a lubricant at a rate of 1% by weight of the catalyst, it is packaged in the form of pellets (5×5 mm).

They are decomposed under air, by gradually raising the temperature 50° C./hour to 420° C., a stage that it held for 5 hours. Cooling is performed under air to ambient temperature. The resulting product retains a residual moisture of 2-3% by weight.

The weight composition of dry catalyst II is the following: $Al_2O_3$: 9.95%; $Cr_2O_3$: 13.44%; $Fe_2O_3$: 76.16%; $CeO_2$: 0.45%. The specific surface is 102 m²/g, the diameter of the pores being between 50 and 5,000 Å.

EXAMPLE 3

Coprecipitation Method

There are mixed in a stainless steel mixer for 15 minutes: 3,420 g of iron sulfate, $FeSO_4.7H_2O$; 214.7 g of sodium dichromate, $Na_2Cr_2O_7.2H_2O$; and 754.2 g of aluminum sulfate, $Al_2(SO_4)_3.18H_2O$. After homogenization of the totality, the mixture of salts is transferred into a precipitation vat. There is added, by distribution over the totality, a sodium hydroxide solution with a volume of 8 l and containing 1138 g of NaOH. After agitation, it is allowed to stand for an hour, then 12 liters of water are added. It is brought to boiling for 2 hours, then filtered hot and washed on a filter with 31 liters of water, at ambient temperature. The precipitate is dried at 100° C. for 20 hours, then after granulation and addition of a lubricant at a rate of 1%, it is put into cylindrical pellets (5 mm/5 mm). Then, the pellets are decomposed by heat by raising the temperature at a rate of 50° C. per hour to 450° C., and kept at this temperature for 4 hours. Cooling under air to ambient temperature is then performed. The weight composition of catalyst III is the following: $Al_2O_3$:10%; $Cr_2O_3$: 9.5%; $Fe_2O_3$: 80.5%.

The residual sulfur content is 0.4%.

The specific surface is 83 m²/g, the diameter of the pores being between 50 and 5,000 Å.

EXAMPLE 4

This example illustrates the use of the preceding catalysts and makes it possible to compare their effectiveness under rigorously identical conditions by using the tail gases of an industrial nitric acid unit.

The results are given in table I below.

The process of purification of nitrogen oxides contained in ammonia is performed under a pressure of 6 bars absolute, at an input temperature of the gaseous mixtures of 200° C. The high volumetric velocity VVH expresses the delivery of gas coming in over the catalyst in normal liters per hour divided by the volume of the catalyst in liters. The content in nitrogen oxides $NO_x$ is expressed in vpm (volume per million). The $NO_x$ contents of the incoming gases on the catalyst expressed in vpm are carried in column II. The $NO_x$ contents of the exiting gases in vpm are carried in column V. The amounts of ammonia added to the incoming mixture expressed in moles $NH_3$/moles $NO_x$ appear in column III. The volumetric velocities VVH are in column IV, the pressures in bars absolute P in column V, and the temperature of the incoming mixture on the catalyst expressed in °C. in column VI.

TABLE I

| catalyst | $NO_x$ Incoming v.p.m. | moles $NH_3$/ moles $NO_x$ | VVH h$^{-1}$ | P bars abs | T °C. input | $NO_x$ exiting v.p.m. |
|---|---|---|---|---|---|---|
| I | 1500 | 1.00 | 40,000 | 6 | 200 | 15 |
| II | 1500 | 1.00 | 40,000 | 6 | 200 | 10 |
| III | 1500 | 0.95 | 40,000 | 6 | 200 | 12 |

It will be obvious to those skilled in the art that changes may be made without departing from the scope of the invention and the invention is not to be considered limited to what is described in the specification.

What is claimed is:

1. A catalytic composition obtained by coprecipitation, used in purification of gaseous effluents polluted by nitrogen oxides, comprising as active elements, iron and chromium in oxide form associated with alumina and, optionally, a promoter selected from the rare earth oxides, taken separately or in combination, and crude platinum metals, in which the content or rare earth oxides, when present, is between 0.1 and 1% by weight in relation to the active material; wherein the specific surface of said composition is between 50 and 300 m²/g and the dimensions of the pores between 40 and 50,000 Å.

2. A catalytic composition in accordance with claim 1, further containing vanadium in oxide form at rate at most of 4% of the weight of the catalyst.

3. A catalytic composition in accordance with claim 1, obtained by coprecipitation, in which the alumina content is between 5 and 20% of the total weight of the catalyst, the remaining 80 to 95% being made up of iron and chromium active elements in oxide form.

4. A catalytic composition in accordance with claim 3, in which the specific surface is between 50 and 150 m²/g.

5. A catalytic composition in accordance with claim 1, obtained by coprecipitation, in which the alumina content is between 5 and 20% of the total weight of the catalyst, the remaining 80 to 95% being made up of iron and chromium active elements in oxide form and at least one promoter selected from rare earth oxides such as cerium, lanthanum and neodymium oxides.

6. A catalytic composition in accordance with claim 2, obtained by coprecipitation, in which the alumina content is between 5 and 20% of the total weight of the catalyst, the remaining 80 to 95% being made up of iron, chromium and vanadium active elements in oxide form.

7. A catalytic composition in accordance with claim 2, obtained by coprecipitation, in which the alumina content is between 5 and 20% of the total weight of the catalyst, the remaining 80 to 95% being made up of iron, chromium and vanadium active elements in oxide form and at least one promoter selected from rare earth oxides, such as cerium, lanthanum and neodymium oxides.

8. A catalytic composition in accordance with claim 1, obtained by coprecipitation, in which the alumina content is between 5 and 20% of the total weight of the catalyst, the remaining 80 to 95% being made up particularly by iron and chromium active elements in oxide form, the iron in oxide form being preponderant with contents between 70 and 85% in relation to the total weight of the catalyst.

9. A catalytic composition in accordance with claim 1, obtained by coprecipitation, in which the alumina content is between 7 and 13% of the total weight of the catalyst, the remaining 87 to 93% being made up of iron and chromium active elements in oxide form.

10. A catalytic composition in accordance with claim 1, obtained by coprecipitation, in which the alumina content is between 7 and 13% of the total weight of the catalyst, the remaining 87 to 93% being made up of iron and chromium active elements in oxide form and at least one promoter selected from rare earth oxides such as cerium, lanthanum and neodymium oxides.

11. A catalytic composition in accordance with claim 2, obtained by coprecipitation, in which the alumina content is between 7 and 13% of the total weight of the catalyst, the remaining 87 to 93% being made up of iron, chromium and vanadium active elements in oxide form.

12. A catalytic composition in accordance with claim 2, obtained by coprecipitation, in which the alumina content is between 7 and 13% of the total weight of the catalyst, the remaining 87 to 93% being made up of iron, chromium and vanadium active elements in oxide form and at least one promoter selected from rare earth oxides such as cerium, lanthanum and neodymium oxides.

13. A catalytic composition in accordance with claim 1, obtained by coprecipitation, in which the alumina content is between 7 and 13% of the total weight of the catalyst, the remaining 87 to 93% being made up particularly of iron and chromium active elements in oxide form, the iron in oxide form being preponderant with contents between 70 and 85% in relation to the total weight of the catalyst.

14. A process of preparing, by coprecipitation, the catalytic composition according to claim 1, comprising:
   precipitating by a basic reagent a mixture of soluble salts of the active elements, the optional promoters, and aluminum;
   isolating the resulting precipitate and drying for about 24 hours at a temperature between 100° and 120° C.;
   packaging in suitable form; and
   performing heat decomposition under air with progressive raising of the temperature by 50° C./h to a temperature between 350° C., with the temperature stage held for 5 to 10 hours.

15. A process in accordance with claim 14, wherein the basic reagent is ammonia, soda or a carbonate used in excess in relation to the stoichiometry of the corresponding hydroxides.

* * * * *